United States Patent
Maiyuran et al.

(10) Patent No.: US 7,958,284 B2
(45) Date of Patent: Jun. 7, 2011

(54) MULTI-CHANNEL FRACTIONAL CLOCK DATA TRANSFER

(75) Inventors: Subramaniam Maiyuran, Goldriver, CA (US); Christopher Gianos, Sterling, MA (US)

(73) Assignee: Intel Corporation, Santa Clara, CA (US)

( * ) Notice: Subject to any disclaimer, the term of this patent is extended or adjusted under 35 U.S.C. 154(b) by 1428 days.

(21) Appl. No.: 11/363,650

(22) Filed: Feb. 28, 2006

(65) Prior Publication Data

US 2007/0201592 A1    Aug. 30, 2007

(51) Int. Cl.
G06F 3/00    (2006.01)
G06F 5/00    (2006.01)

(52) U.S. Cl. .......................................... 710/52; 710/48
(58) Field of Classification Search .................... 710/52
See application file for complete search history.

(56) References Cited

U.S. PATENT DOCUMENTS

| | | | | |
|---|---|---|---|---|
| 2005/0068974 A1* | 3/2005 | Barker et al. | ................. | 370/419 |
| 2005/0286507 A1* | 12/2005 | sterling et al. | ................ | 370/363 |
| 2006/0265520 A1* | 11/2006 | Kwak et al. | ....................... | 710/8 |
| 2007/0011368 A1* | 1/2007 | Wang et al. | ..................... | 710/52 |
| 2007/0067514 A1* | 3/2007 | Anderson et al. | ............... | 710/70 |

OTHER PUBLICATIONS

Balasubramanian, Suresh, et al., "Deterministic low-latency data transfer across Non-integral ratio", *19th International Conference on VLSI Design and 5th International Conference on Embedded Systems*, Taj Krishna, Hyderabad, India, (Jan. 7, 2006), 8 pgs.

Anderson, Warren, et al., "Deterministic Operation of an Input/Output Interface", U.S. Appl. No. 11/231,273, filed Sep. 20, 2005.

* cited by examiner

*Primary Examiner* — Henry W Tsai
*Assistant Examiner* — Kris Rhu
(74) *Attorney, Agent, or Firm* — Caven & Aghevli LLC

(57) ABSTRACT

Methods and apparatus to transfer data between one or more clock domains are described. In one embodiment, a plurality of signals corresponding to write pointers of a buffer and a read pointer of the buffer are generated. The signals corresponding to the write pointers of the buffer are to be generated based on different data patterns for transmission over different channels. Other embodiments are also claimed and described.

30 Claims, 8 Drawing Sheets

MULTI-CHANNEL FRACTIONAL CLOCK DATA TRANSFER

BACKGROUND

The present disclosure generally relates to the field of electronics. More particularly, an embodiment Of the invention relates to transferring data between clock domains.

As integrated circuit fabrication technology improves, manufacturers are able to integrate additional functionality onto a single chip. With the increase in the number of these functionalities, the number of components on a single chip may also increase. To improve performance (e.g., by operating different components in parallel), some components of a chip may be in a different clock domain (e.g., operating at a different clock frequency) than other components of the same chip. When data is transferred between the different clock domains, data transfer latency may be increased, e.g., to ensure proper synchronization between the different clock domains. The data transfer latency may increase even further when the data traverses multiple clock domains.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 6 illustrates sample data patterns that may be utilized to implement various embodiments discussed herein.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Figure 1:
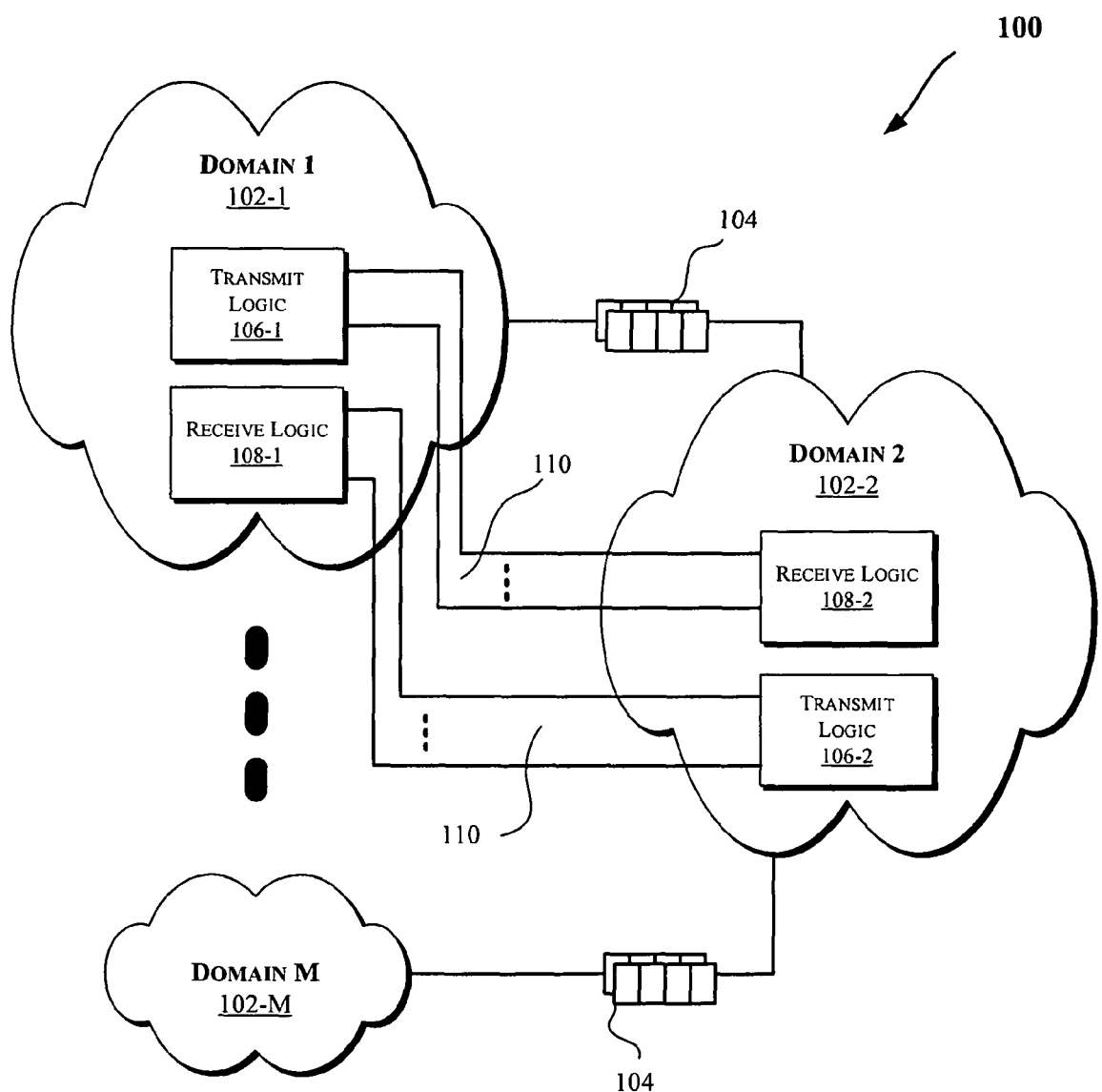
FIG. 1 illustrates a block diagram of a multi-domain system, according to an embodiment.

Some of the embodiments discussed herein may provide techniques for utilizing multiple channels to transfer data between different clock domains, which may be referred to as multi-channel fractional clock data transfer (FCDT). Such techniques may provide a relatively lower latency when transferring data between one or more clock domains present on an integrated circuit (IC) chip. Also, such techniques may be utilized in various environments, such as those discussed with reference to FIGS. 1-8. More particularly, FIG. 1 illustrates a block diagram of a multi-domain system 100, according to an embodiment. The system 100 may include one or more domains 102-1 through 102-M (collectively referred to herein as "domains 102"). Each of the domains 102-1 through 102-M may include various components, but for clarity, sample components are only shown with reference to domains 102-1 and 102-2. In an embodiment, each of the domains 102 may include various circuitry (or logic) that is clocked by a clock signal that may be different that the clock signal used in other domains. In one embodiment, one or more of these clock signals may be mesosynchronous, or otherwise related (e.g., with a relationship that may or may not repeat itself over time).

As illustrated in FIG. 1, each domain may communicate data with other domains through one or more buffers 104. In an embodiment, the buffers 104 may be first-in, first-out (FIFO) buffers. Each domain may include a transmit logic (such as transmit logics 106-1 and 106-2 shown with reference to domains 102-1 and 102-2, respectively) and a receive logic (such as receive logics 108-1 and 108-2 shown with reference to domains 102-1 and 102-2, respectively). The logics 106 and 108 may communicate via a plurality of channels 110, as will be further discussed herein, for example, with reference to FIGS. 2-6.

Figure 2:
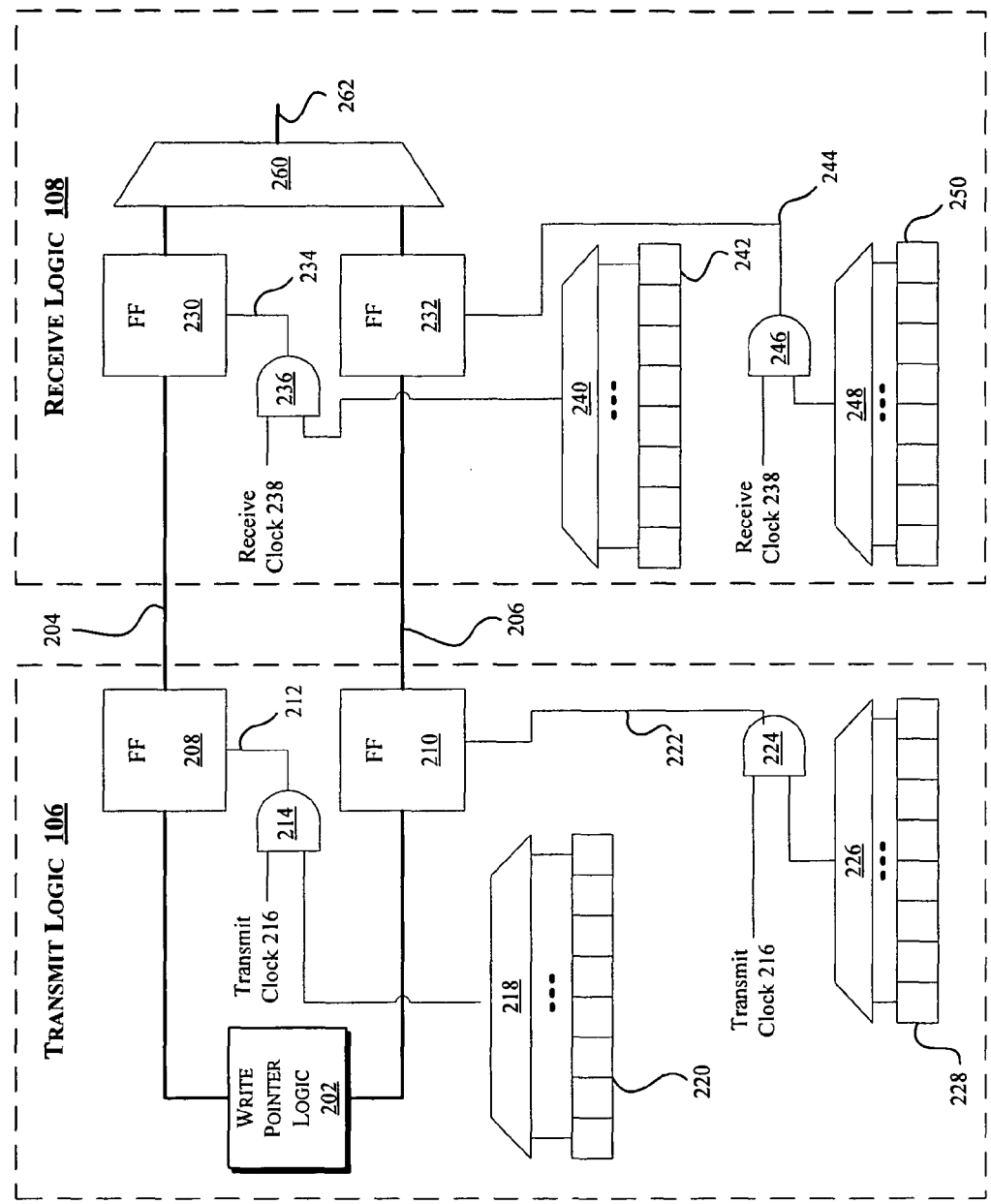
FIG. 2 illustrates a block diagram of further details of the transmit logic and receive logic discussed with reference to FIG. 1, according to an embodiment.

FIG. 2 illustrates a block diagram of further details of the transmit logic 106 and receive logic 108 of FIG. 1, according to an embodiment. The transmit logic 106 may include a write pointer logic 202 to determine the number of channels (such as the channels 110 of FIG. 1) over which to transmit a plurality of signals corresponding to a plurality of write pointers of a buffer (e.g., such as the buffers 104 of FIG. 1), as will be further discussed herein, for example, with reference to FIG. 5.

For simplicity, FIG. 2 only shows two channels (204 and 206) over which buffer pointers (e.g., to the buffers 104 of FIG. 1) may be transmitted between a first domain (e.g., a domain that includes the transmit logic 106) and a second domain (e.g., a domain that includes the receive logic 108). However, more than two channels may be used in other embodiments. In an embodiment, the write pointer logic 202 may transmit two different write pointers via the channels 204 and 206. The write pointers communicated over channels 204 and 206 may be stored in the flip-flops (FFs) 208 and 210, respectively.

As shown in FIG. 2, flip-flop 208 may receive a clock enable signal 212 from an AND gate 214. The AND gate 214 may logically AND a transmit clock signal 216 and a signal received from a multiplexer 218. The multiplexer 218 may multiplex data stored in a storage device 220. In an embodiment, the storage device 220 may store a data pattern used for enabling transfer of a signal that corresponds to a write pointer over channel 204 to the receive logic 108. As also illustrated in FIG. 2, the flip-flop 210 may receive a clock enable signal 222 from an AND gate 224. The AND gate 224 may logically AND the transmit clock signal 216 and a signal received from a multiplexer 226. The multiplexer 226 may multiplex data stored in a storage device 228. In an embodiment, the storage device 228 may store a data pattern used for enabling transfer of a signal that corresponds to a write pointer over channel 206 to the receive logic 108. In one embodiment, the data patterns stored in the storage devices 220 and 228 may be generated prior to operation of the device that includes the transmit logic 106. Moreover, the storage devices 220 and 228 may be implemented as hardware registers and/or variables stored in a memory (such as the memories discussed with reference to FIGS. 3 and 6-7).

The receive logic 108 may include flip-flops 230 and 232 to store values corresponding to the signals communicated via the channels 204 and 206, respectively. As shown in FIG. 2, flip-flop 230 may receive a clock enable signal 234 from an AND gate 236. The AND gate 236 may logically AND a receive clock signal 238 (which may be different clock signal than the clock signal 216) and a signal received from a multiplexer 240. The multiplexer 240 may multiplex data stored in a storage device 242. In an embodiment, the storage device 242 may store a data pattern used for enabling the flip-flop 230 to generate a signal that corresponds to the write pointer transmitted over channel 204. As also illustrated in FIG. 2, the flip-flop 232 may receive a clock enable signal 244 from an AND gate 246. The AND gate 246 may logically AND the receive clock signal 238 and a signal received from a multiplexer 248. The multiplexer 248 may multiplex data stored in a storage device 250. In an embodiment, the storage device 250 may store a data pattern used for enabling the flip-flop 232 to generate a signal that corresponds to the write pointer transmitted over channel 206. In one embodiment, the data patterns stored in the storage devices 242 and 250 may be generated prior to operation of the device that includes the receive logic 108. Moreover, the storage devices 242 and 250 may be implemented as hardware registers and/or variables stored in a memory (such as the memories discussed with reference to FIGS. 3 and 6-7).

As shown in FIG. 2, the receive logic 108 may also include a multiplexer 260 to multiplex the outputs of the flip-flops 230 and 232, e.g., to generate a signal 262 that corresponds to a read pointer that results from combining the write pointers communicated over the channels 204 and 206. As will be further discussed herein, e.g., with reference to FIGS. 4 and 5, the output of the signal 262 may be used as a read pointer of the buffer(s) 104 of FIG. 1. In one embodiment, the signal 262 may correspond to a read pointer value (or threshold) that may be compared to a local read pointer value to determine if the local read pointer may be advanced and, for example, more data may be read out of the corresponding buffer (104).

Figure 3:
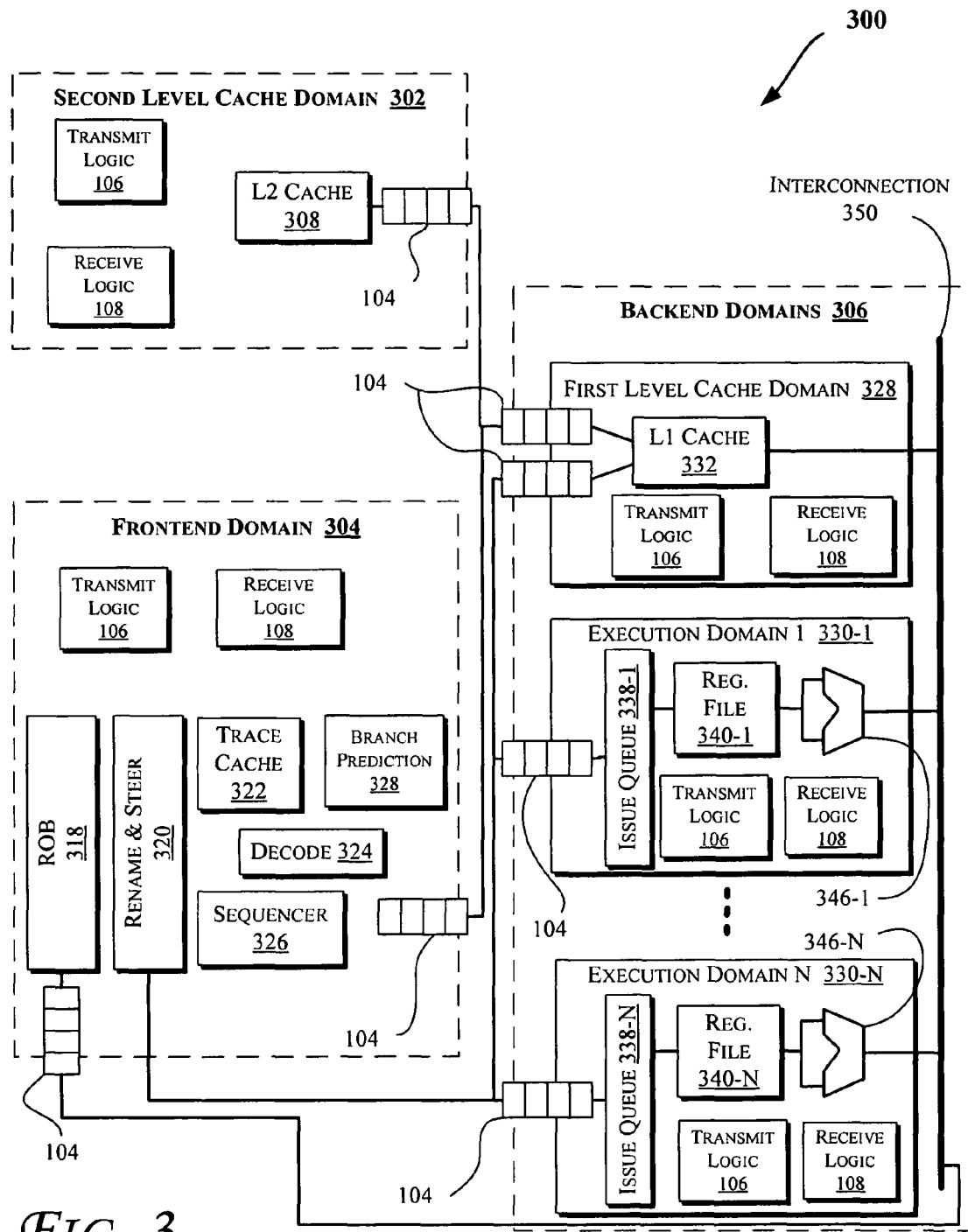
FIG. 3 illustrates a block diagram of a processor core, according to an embodiment.

FIG. 3 illustrates a block diagram of a processor core 300, according to an embodiment. In one embodiment, the core 300 may represent various components that may be present in a processor or number of processors (such as those discussed with reference to FIGS. 6 and 7). The processor core 300 may include one or more domains such as a second level cache domain 302, a frontend domain 304, and one or more backend domains 306. Components within each of the domains 302, 304, and 306 may be clocked by a different clock signal such as discussed with reference to FIGS. 1-2. Moreover, each of the domains (e.g., 302, 304, and 306) may include more or less components than those shown in FIG. 3 in various embodiments.

The second level (L2) cache domain 302 may include an L2 cache 308 (e.g., to store date including instructions), the transmit logic 106, and the receive logic 108. In one embodiment, the L2 cache 308 may be shared by multiple cores in a multi-core processor such as those discussed with reference to FIGS. 6 and 7. Also, the L2 cache 308 may be off of the same die as the processor cores. Accordingly, in various embodiments of the invention, a processor may include the domains 304 and 306, and may or may not include the L2 cache 308. As discussed with reference to FIGS. 1-2, the transmit logic 106 may generate and transmit a plurality of write pointers of corresponding buffers 104 over a plurality of channels (e.g., channels 110 of FIG. 1 and/or 204-206 of FIG. 2) to the receive logic 108 to generate a read pointer of the corresponding buffers 104.

As shown in FIG. 3, the frontend domain 304 may include one or more of the transmit logic 106, receive logic 108, a reorder buffer 318, a rename and steer unit 320, a trace cache 322, a decode unit 324, a sequencer 326, and/or a branch prediction unit 328. In one embodiment, the frontend domain 304 may include other components such as an instruction fetch unit. As discussed with reference to FIGS. 1-2, the transmit logic 106 may generate and transmit a plurality of write pointers of corresponding buffers 104 over a plurality of channels (e.g., channels 110 of FIG. 1 and/or 204-206 of FIG. 2) to the receive logic 108 to generate a read pointer of the corresponding buffers 104.

The backend domains 306 may include one or more of a first level (L1) cache domain 328 and one or more execution domains 330-1 through 330-N. The L1 cache domain 328 may include an L1 cache 332 (e.g., to store data including instructions), the transmit logic 106, and the receive logic 108. As discussed with reference to FIGS. 1-2, the transmit logic 106 may generate and transmit a plurality of write pointers of corresponding buffers 104 over a plurality of channels (e.g., channels 110 of FIG. 1 and/or 204-206 of FIG. 2) to the receive logic 108 to generate a read pointer of the corresponding buffers 104.

Furthermore, the execution domains 330-1 through 330-N may include one or more of an integer execution unit and/or a floating point execution unit. The execution domains 330-1 through 330-N may each comprise an issue queue (338-1 through 338-N, respectively), a register file (340-1 through 340-N, respectively), the transmit logic 106, the receive logic 108, and/or an execution unit (346-1 through 346-N, respectively). As discussed with reference to FIGS. 1-2, the transmit logic 106 may generate and transmit a plurality of write pointers of corresponding buffers 104 over a plurality of channels (e.g., channels 110 of FIG. 1 and/or 204-206 of FIG. 2) to the receive logic 108 to generate a read pointer of the corresponding buffers 104.

In one embodiment, each of the domains 302, 304, and 306 may include one or more first-in, first-out (FIFO) buffer(s) 104 to synchronize communication between the various clock domains (e.g., between the domains 302, 304, and/or 306). In an embodiment, the FIFO buffers 104 may be accessed by utilizing read/write pointers that are generated by the corresponding transmit logic 106 and/or receive logic 108, such as discussed with reference to FIGS. 1-2.

Additionally, the processor core 300 (and, in an embodiment, such as the one shown in FIG. 3, the backend domains 306) may include an interconnection or bus 350 to facilitate communication between various components of the processor core 300. For example, after an instruction is successfully executed (e.g., by the execution domains 330-1 through 330-N), the instruction commit may be communicated to the ROB 318 (e.g., via the interconnection 350) to retire that instruction. Additionally, the domains within the backend (e.g., domains 328 and 330-1 through 330-N) may communicate via the interconnection 350. For example, communication among execution units (330-1 through 330-N) may occur for type conversion instructions. Further operations of components of FIGS. 1-3 will now be discussed with reference to the methods of FIGS. 4 and 5.

Figure 4:
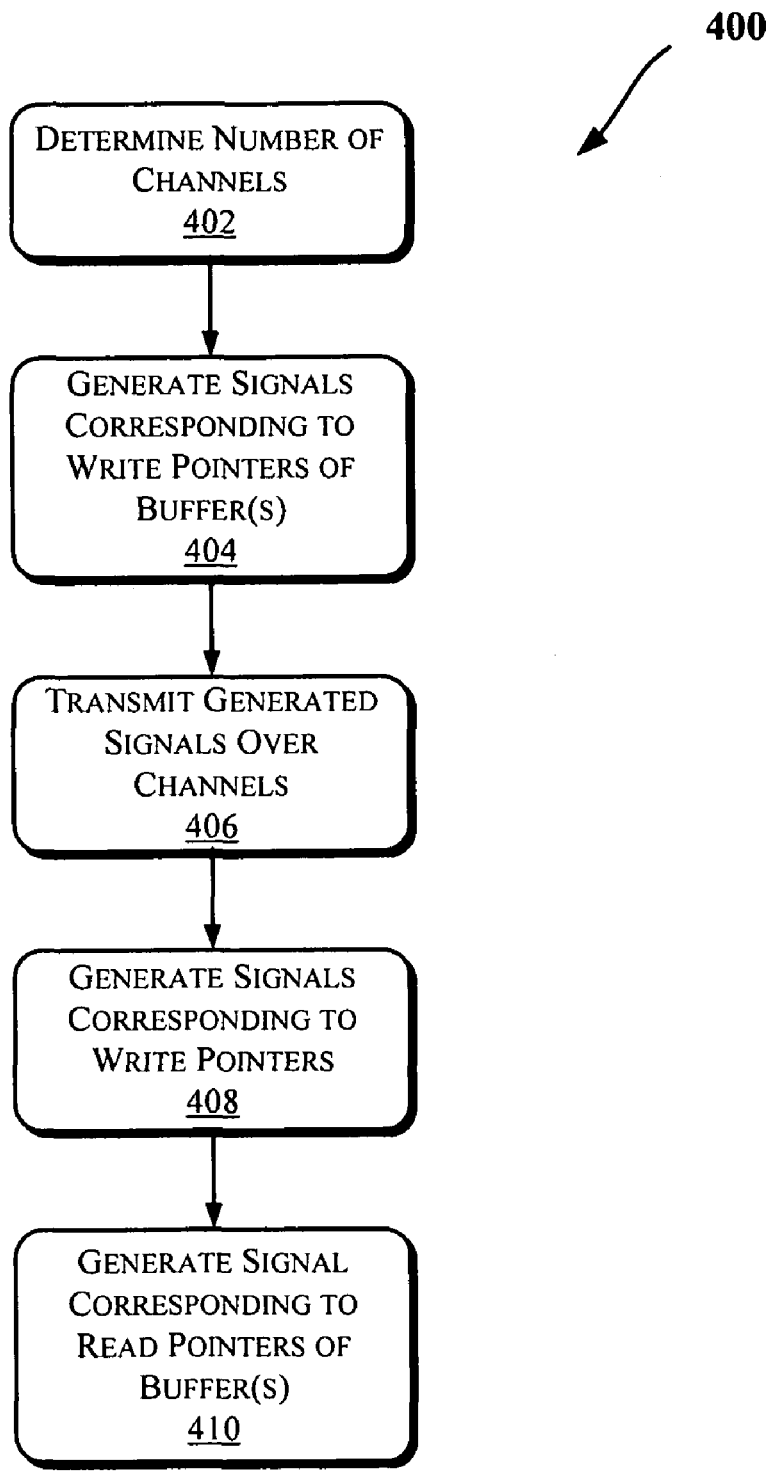
FIG. 4 illustrates a flow diagram of an embodiment of a method to generate a signal corresponding to read pointer of one or more buffers.

FIG. 4 illustrates a flow diagram of a method 400 to generate a signal corresponding to read pointer of one or more buffers, according to an embodiment. For example, the method 400 may be utilized to generate the signal 262 for buffers 104 of FIG. 2. In one embodiment, the operations of the method 400 may be performed by one or more components discussed with reference to FIGS. 1-3 and 6-7.

Referring to FIGS. 1-4, at an operation 402, the write pointer logic 202 may determine the number of channels 110 that may be used to transmit a plurality of write pointers from the transmit logic 106 to the receive logic 108, as will be further discussed with reference to FIG. 5. At an operation 404, the write pointer logic 202 may generate the signals corresponding to the write pointers of buffer(s) 104. As discussed with reference to FIG. 2, the generated signals at operation 404 may be stored in the flip-flops 208 and 210 and subsequently transmitted over the channels 110 (e.g., channels 204 and 206) at operation 406 in accordance with the signals 212 and 222, respectively.

At an operation 408, the flip-flops 230 and 232 may generate signals that correspond to write pointers of the buffer(s) 104. As discussed with reference to FIG. 2, the generated signals at operation 408 may be stored in the flip-flops 230 and 232 and subsequently transmitted to the multiplexer 260 in accordance with the signals 234 and 244, respectively. The multiplexer 260 may multiplex the generated signals of operation 408 to generate the signal 262 corresponding to a read pointer of the buffer(s) 104 at operation 410.

Figure 5:
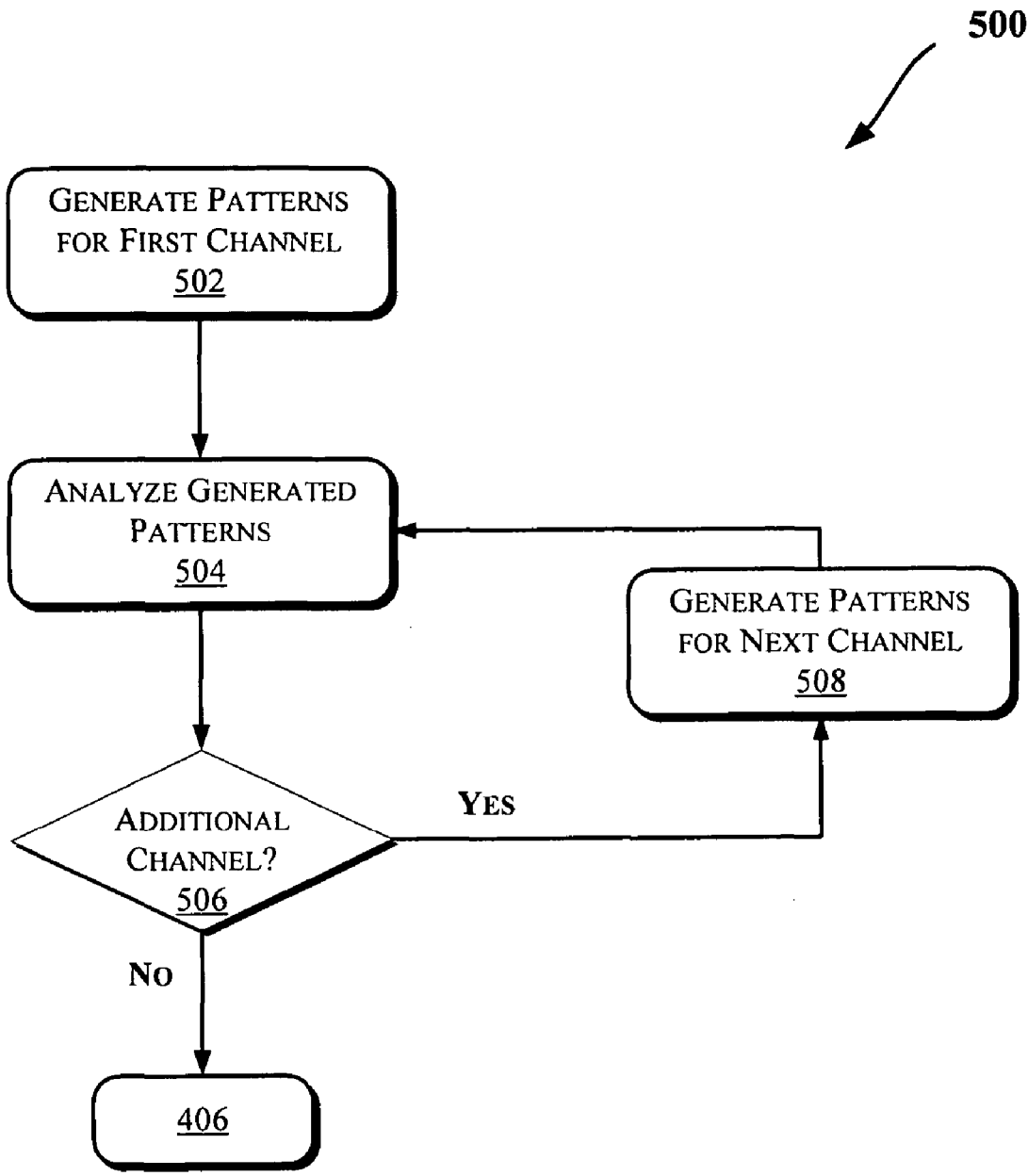
FIG. 5 illustrates a flow diagram of a method to generate data patterns for transmitting signals over a plurality of channels between various domains, according to an embodiment.

FIG. 5 illustrates a flow diagram of a method 500 to generate data patterns for transmitting signals over a plurality of channels between various domains, according to an embodiment. For example, the method 500 may be utilized to generate the data patterns stored in the storage devices 220, 228, 242, and/or 250 of FIG. 2. In one embodiment, the operations of the method 500 may be performed by one or more components discussed with reference to FIGS. 1-3 and 6-7. Also, in various embodiments, the generated data patterns of FIG. 5 may be referred to as FCDT data patterns and may be stored in one or more registers by a basic input output system (BIOS), for example, at the initial boot sequence of a computing system (such as the computing systems discussed with reference to FIGS. 7 and 8). In one embodiment, a BIOS may select from a multitude of generated data patterns, for example, based on strap pins (e.g., for an uncore frequency) and/or fuse values (e.g., for processor core frequency).

Referring to FIGS. 1-5, at an operation 502, data patterns for transmission of signals over a first channel are generated. In an embodiment, the first transmit edge is determined which may be referred to as $t_1^{c1}$ (or first transmission data pattern of channel 1 (c1)). This may be the first or second edge of the transmit clock 216. Since the clock edges may be periodic within a coarsely synchronous interval, arbitrarily any clock edge may be selected with some attention to the wrap around boundaries of the data pattern. In one embodiment, the length of the data patterns stored in the storage devices 220, 228, 242, and/or 250 of FIG. 2 may correspond to the coarsely synchronous interval discussed herein with reference to FIG. 5. The corresponding receive edge may then be determined based on the transmit edge as follows:

$$r_1^{c1} = \left(abs\left(\frac{X}{T_{period,receive}}\right) + 1\right) * T_{period,receive},$$

where $r_1^{c1}$, is the first receive enable for channel 1 corresponding to the transmission edge $t_1^{c1}$, $T_{period,receive}$ is the period for receiving the receive edge, and X is defined as:

$$x = t_1^{c1} + Setup + Skitter + logic(if\ any) + wire,$$

where X and the other values may be in Picoseconds, Setup is the setup time, Skitter is a time period associated with the skew and jitter, logic is the delay associate with any logic, and wire is the delay associated with transmitting signals over the wire.

In the above equation, X may be replaced with the next or closest corresponding clock edge. The next transmit edge may be determined based on the previous receive edge:

$$t_2^{c1} = \left(abs\left(\frac{Y}{T_{period,xmit}}\right) + 1\right) * T_{period,xmit},$$

where $Y = r_1^{c1} + Hold + Skitter + logic + wire$, and where Hold is the hold time.

This process may be repeated until all transmit and receive enable edges are determined for channel 1 in the coarsely synchronous interval. Accordingly, the transmit and receive enable edges are:

$$T^{c1} = \{t_1^{c1}, t_2^{c1}, \ldots, t_n^{c1}\}$$

$$R^{c1} = \{r_1^{c1}, r_2^{c1}, \ldots, r_n^{c1}\}$$

In one embodiment, the above generated vectors illustrate sample values for the enable edges that may be used for transmission of signals over the first channel. These vectors may be used to generate the corresponding digital 1s and 0s of a fractional clock data transfer (FCDT) data pattern, e.g., to enable transfer of data between the transmit logic 106 and the receive logic 108 discussed with reference to FIGS. 1-4.

At an operation 504, the generated data patterns of operation 502 are analyzed to determine whether additional channels are possible (and/or would provide further efficiency (506)). For example, the following latency requirements may be used as a criteria to select additional channels:

$$Q = \begin{cases} T^{c1} & \text{if transmit frequency} \leq \text{receive frequency} \\ R^{c1} & \text{if transmit frequency} > \text{receive frequency} \end{cases}$$

In an embodiment, Q assumes either a transmit or receive set of vectors based on the frequency ratios, e.g., by analyzing the relatively slower clock domain and determining whether there are more edges possible.

For example, let:

$$Lavg = \frac{\sum_{i=1}^{n}(q_{i+1} - q_i)}{n},$$

where $q_n$ is the first of the next coarsely synchronous interval.

To estimate the number of possible channels:

$$c_{max} \leq abs\left(\frac{L_{avg}}{T_{period,\ slowf}}\right),$$

where $c_{max}$ is the estimated number of channels, $T_{period,slowf} = Max\{T_{period,xmit}, T_{period,receive}\}$ At operation 506, if there is no additional channel possible as determined above, the generated channel data pattern may be used to transmit signals (e.g., according with operation 406 of FIG. 4). If there is possibility for more channels, then the corresponding channel data patterns may be generated (508) by choosing $c_{required} \leq c_{max}$ channels, e.g., based on a given design. In particular, the first transmit edge of the next channel may be determined by defining $t_k^{ci}$ and assigning $k=1$, $i=2$ (e.g., the first edge of the second channel). Also, $j=1$ may be defined to initialize the transmit edge search for the next transmit edge, e.g., by searching for an edge in between established edges (j+1 and j) in a set T, where:

$$Z = \left(\frac{t_{j+1} - t_j}{c_{required}}\right)$$

$$t_k^{ci} = t_j + \left(\text{abs}\left(\frac{Z}{T_{period,xmit}}\right) + 1\right) * T_{period,xmit}$$

If $t_k^{ci}=t_{j+1}$, there may be no transmit edge in this interval(j, j+1), and the value of j may be incremented, and the next interval of transmission edges may be determined as discussed above. If there is an edge, the next corresponding receive edge may be determined in accordance with the following:

$$r_k^{ci} = \left(\text{abs}\left(\frac{X}{T_{period,receive}}\right) + 1\right) * T_{period,receive},$$

where $x=t_k^{ci}$+Setup+Skitter+logic(if any)+wire

In an embodiment, receive edge boundaries and order may also be checked. If the receive edge exceeds the coarsely synchronous boundary, the last transmit edge (which was just picked) may be disregarded. In particular, if $r_k^{ci}=r_j$, then a different transmit edge within the same interval may be determined. Hence, j may remains the same with $t_k^{ci}=t_k^{ci}+T_{preiod,xmit}$ (e.g., select the next edge in the same interval). If $r_k^{ci}=r_{j+1}$, there is a corresponding receive edge in the present interval and the next transmit interval may be considered by incrementing j. If $r_j < r_k^{ci} < r_{j+1}$, the next transmit edge for the current channel may be determined. The next transmit channel may be determined based on the previous receive edge:

$$t_{k+1}^{ci} = \left(\text{abs}\left(\frac{Y}{T_{period,xmit}}\right) + 1\right) * T_{period,xmit}$$

$$Y = r_k^{ci} + \text{Hold} + \text{Skitter} + \text{logic} + \text{wire}$$

If the $t_{k+1}^{ci}$ is within the boundary, search in the set T for the next j, e.g., by determining the new j. If there is no possible new j or the $t_{k+1}^{ci}$ exceeds the coarsely synchronous boundary, all possible channels may have not been exhausted, i.e. $c < c_{required}$ and additional data patterns for the other channels may be generated (508). For example, a vector which combines all the channel data patterns may be generated (for computational purposes). Individual data patterns may still be preserved for each channel. The combined vector may be:

$$R = \overset{c}{\underset{i=1}{Y}} R^{ci}$$

$$T = \overset{c}{\underset{i=1}{Y}} T^{ci}$$

If all possible channels are found (506), then the method 500 may resume at operation 406 of FIG. 4. Otherwise, the value of c may be incremented and additional data patterns may be generated at operation 508. In an embodiment, a final check of the generated data patterns may be optionally performed, e.g., to ensure the ordering and utilization of other possible optimization. In particular, there may be several heuristics involved, e.g., individual design-specific optimizations may be performed. For example, if there is a channel with only one transmit and receive data pattern in a given interval, potentially this may be removed based on the cost benefit analysis. Also, if multiple channels are found and the data patterns are alternating for all possible frequencies, a single data pattern register may be used.

Figure 6:
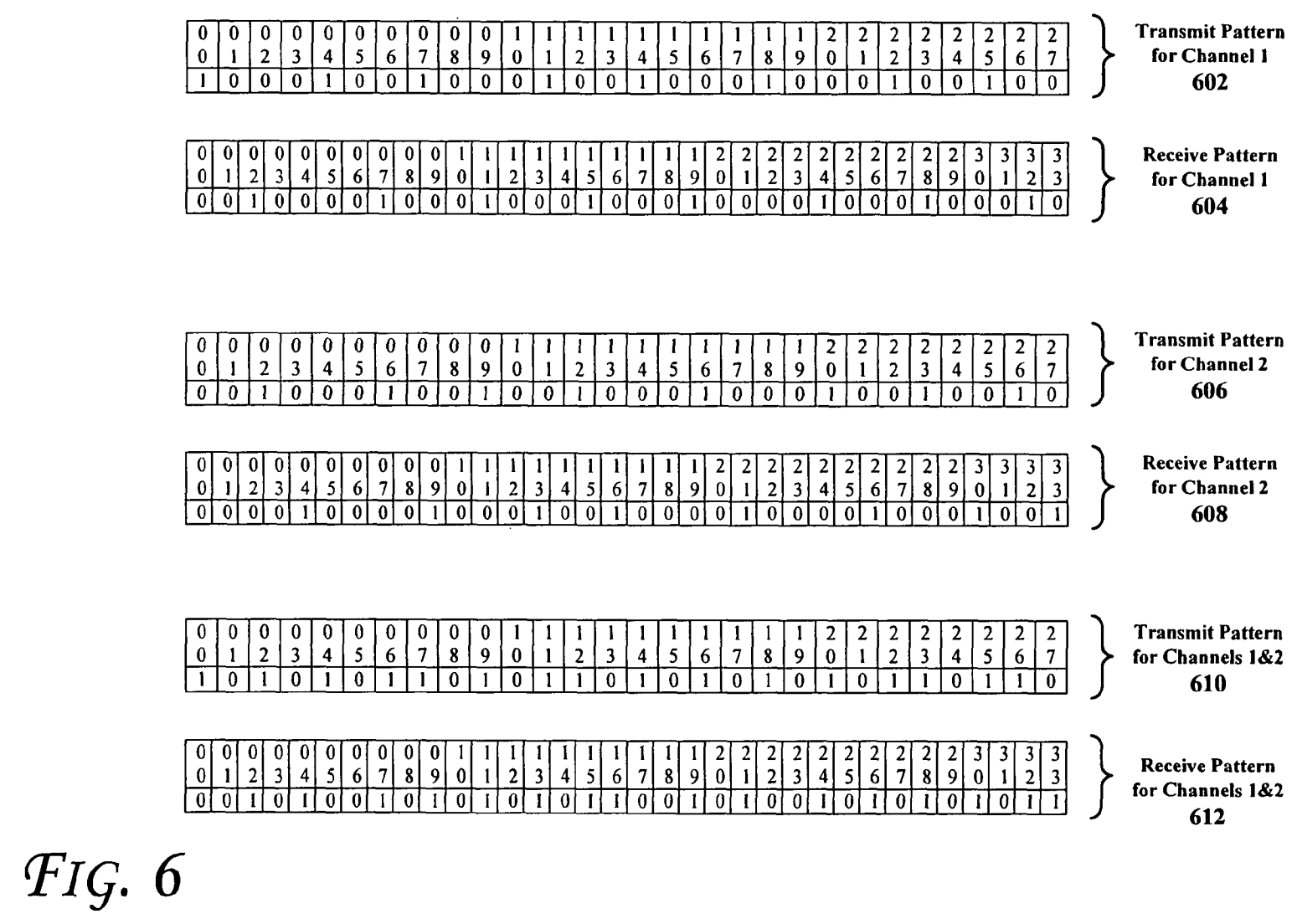

FIG. 6 illustrates sample data patterns that may be utilized to implement various embodiments discussed herein. For example, the data patterns illustrated in FIG. 6 may be generated in accordance with the embodiments discussed with reference to method 500 of FIG. 5. Moreover, the data patterns of FIG. 6 may be used to transfer data over one or more channels (even though only two channels are discussed with reference to FIG. 6), such as the channels discussed with reference to FIGS. 1 (e.g., channels 110) and 2 (e.g., channels 204 and/or 206). The first row of each data pattern 602-612 may denote the edges of each clock and the second row may illustrate the corresponding transmit/receive enable signal.

As illustrated in FIG. 6, data pattern 602 may be a transmit data pattern for channel 1, data pattern 604 may be a receive data pattern for channel 1, data pattern 606 may be a transmit data pattern for channel 2, data pattern 608 may be a receive data pattern for channel 2, data pattern 610 may be a transmit data pattern for channels 1 and 2, and data pattern 612 may be the receive data patterns for channels 1 and 2. In an embodiment, the values corresponding to the second row of the data patterns 602 and 606 may be stored in the storage devices 220 and 228 of FIG. 2, respectively. Moreover, the values corresponding to the second row of the data patterns 604 and 608 may be stored in the storage devices 242 and 250 of FIG. 2, respectively. As discussed with reference to FIG. 2, at each edge of the clock signal 216, the stored data pattern values (602 and 606) may be used to enable transfer of signals over the channels 204 and 206, respectively. Also, at each edge of the clock signal 238, the stored data pattern values (604 and 608) may be used to enable receipt of signals over the channels 204 and 206, respectively.

Figure 7:
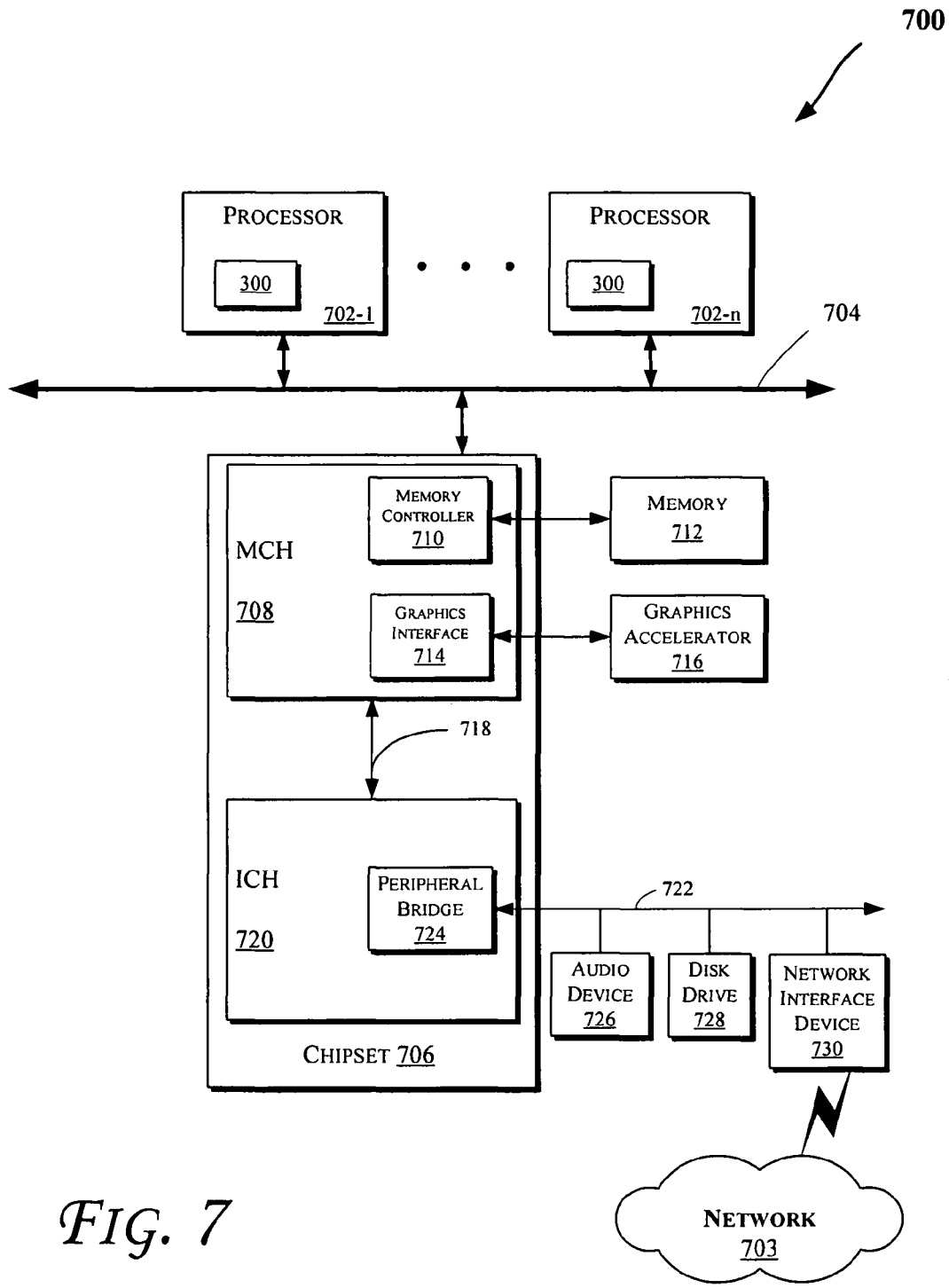
FIGS. 7 and 8 illustrate block diagrams of embodiments of computing systems, which may be utilized to implement various embodiments discussed herein.

FIG. 7 illustrates a block diagram of a computing system 700 in accordance with an embodiment of the invention. The computing system 700 may include one or more central processing unit(s) (CPUs) 702 or processors in communication with an interconnection network (or bus) 704. The processors 702 may be any processor such as a general purpose processor, a network processor (that processes data communicated over a computer network 703), or other types of a processor (including a reduced instruction set computer (RISC) processor or a complex instruction set computer (CISC)). Moreover, the processors 702 may have a single or multiple core design. The processors 702 with a multiple core design may integrate different types of processor cores on the same integrated circuit (IC) die. Also, the processors 702 with a multiple core design may be implemented as symmetrical or asymmetrical multiprocessors. In an embodiment, one or more of the processors 702 may utilize the embodiments discussed with reference to FIGS. 1-6. For example, one or more of the processors 702 may include one or more cores with multiple clock domains (e.g., core 300 of FIG. 3). Also, the operations discussed with reference to FIGS. 1-6 may be performed by one or more components of the system 700.

A chipset 706 may also be in communication with the interconnection network 704. The chipset 706 may include a memory control hub (MCH) 708. The MCH 708 may include a memory controller 710 that communicates with a memory 712. The memory 712 may store data and sequences of instructions that are executed by the CPU 702, or any other device included in the computing system 700. In one embodiment of the invention, the memory 712 may include one or more volatile storage (or memory) devices such as random access memory (RAM), dynamic RAM (DRAM), synchronous DRAM (SDRAM), static RAM (SRAM), or other types of memory. Nonvolatile memory may also be utilized such as a hard disk. Additional devices may communicate through the interconnection network 704, such as multiple CPUs and/or multiple system memories.

The MCH 708 may also include a graphics interface 714 that communicates with a graphics accelerator 716. In one embodiment of the invention, the graphics interface 714 may be in communication with the graphics accelerator 716 via an accelerated graphics port (AGP). In an embodiment of the invention, a display (such as a flat panel display) may communicate with the graphics interface 714 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 718 may allow the MCH 708 to communicate with an input/output control hub (ICH) 720. The ICH 720 may provide an interface to I/O devices that communicate with the computing system 700. The ICH 720 may communicate with a bus 722 through a peripheral bridge (or controller) 724, such as a peripheral component interconnect (PCI) bridge, a universal serial bus (USB) controller, or other types of a bus. The bridge 724 may provide a data path between the CPU 702 and peripheral devices. Other types of topologies may be utilized. Also, multiple buses may communicate with the ICH 720, e.g., through multiple bridges or controllers. Moreover, other peripherals in communication with the ICH 720 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other types of peripherals.

The bus 722 may communicate with an audio device 726, one or more disk drive(s) 728, and a network interface device 730 (which may be in communication with the computer network 703). Other devices may communicate through the bus 722. Also, various components (such as the network interface device 730) may be in communication with the MCH 708 in some embodiments of the invention. In addition, the processor 702 and the MCH 708 may be combined to form a single chip. Furthermore, the graphics accelerator 716 may be included within the MCH 708 in other embodiments of the invention.

Furthermore, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media capable of storing electronic instructions and/or data.

Figure 8:
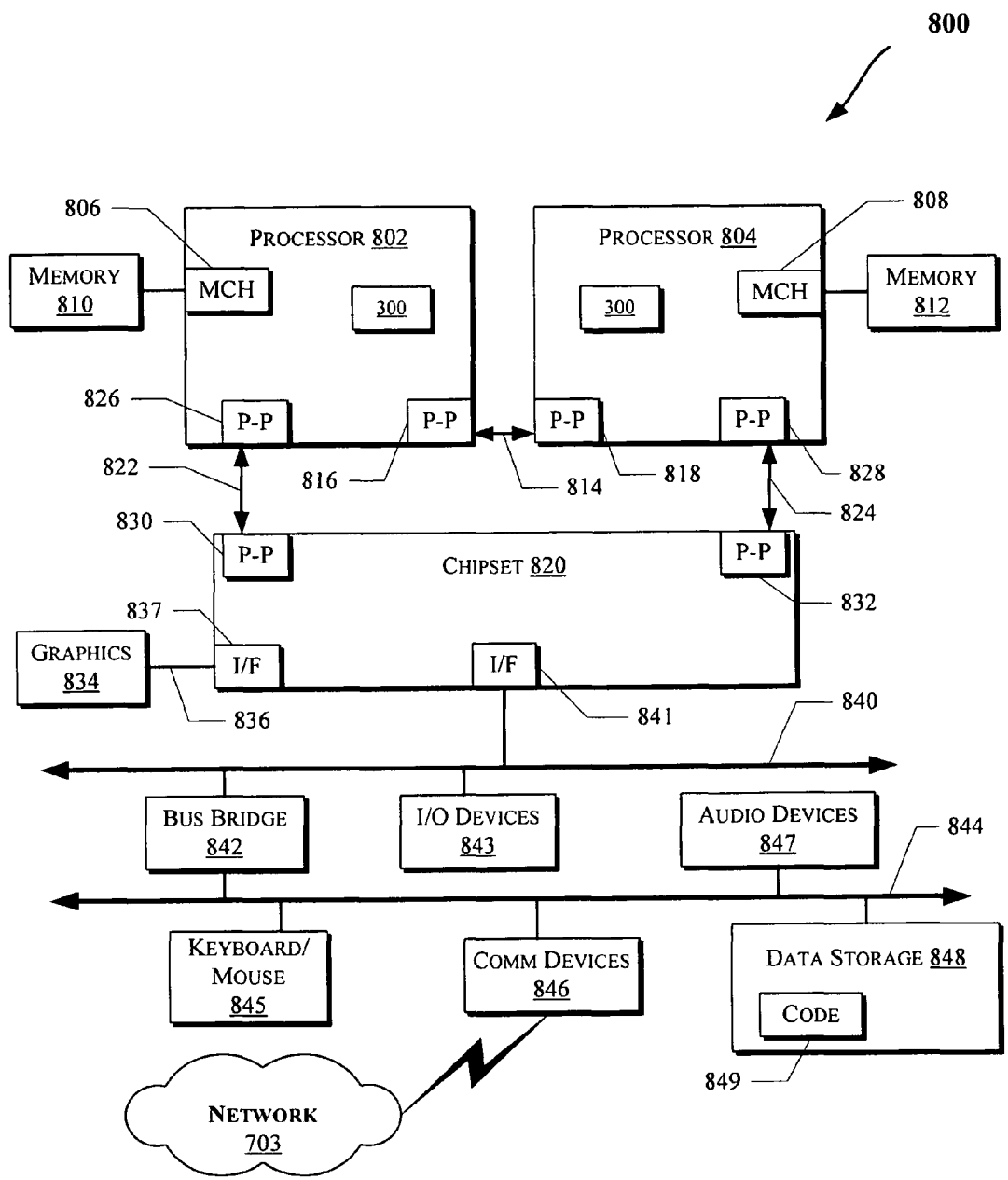

FIG. 8 illustrates a computing system 800 that is arranged in a point-to-point (PtP) configuration, according to an embodiment of the invention. In particular, FIG. 8 shows a system where processors, memory, and input/output devices are interconnected by a number of point-to-point interfaces. The operations discussed with reference to FIGS. 1-6 may be performed by one or more components of the system 800.

As illustrated in FIG. 8, the system 800 may include several processors, of which only two, processors 802 and 804 are shown for clarity. The processors 802 and 804 may each include a local memory controller hub (MCH) 806 and 808 to communicate with memories 810 and 812. The memories 810 and/or 812 may store various data such as those discussed with reference to the memory 712.

The processors 802 and 804 may be any type of a processor such as those discussed with reference to the processors 702 of FIG. 7. The processors 802 and 804 may exchange data via a point-to-point (PtP) interface 814 using PtP interface circuits 816 and 818, respectively. The processors 802 and 804 may each exchange data with a chipset 820 via individual PtP interfaces 822 and 824 using point to point interface circuits 826, 828, 830, and 832. The chipset 820 may also exchange data with a high-performance graphics circuit 834 via a high-performance graphics interface 836, using a PtP interface circuit 837.

At least one embodiment of the invention may be provided within the processors 802 and 804. For example, one or more of the clock domains discussed with reference to FIG. 3 may be located within the processors 802 and 804. Other embodiments of the invention, however, may exist in other circuits, logic units, or devices within the system 800 of FIG. 8. Furthermore, other embodiments of the invention may be distributed throughout several circuits, logic units, or devices illustrated in FIG. 8.

The chipset 820 may be in communication with a bus 840 using a PtP interface circuit 841. The bus 840 may have one or more devices that communicate with it, such as a bus bridge 842 and I/O devices 843. Via a bus 844, the bus bridge 843 may be in communication with other devices such as a keyboard/mouse 845, communication devices 846 (such as modems, network interface devices, or other types of communication devices that may be communicate through the computer network 703), audio I/O device, and/or a data storage device 848. The data storage device 848 may store code 849 that may be executed by the processors 802 and/or 804.

In various embodiments of the invention, the operations discussed herein, e.g., with reference to FIGS. 1-8, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include any type of a storage device such as those discussed with respect to FIGS. 7 and 8.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising: a first hardware logic circuitry to generate a first signal corresponding to a first write pointer of a buffer and a second signal corresponding to a second write pointer of the buffer; and a second hardware logic circuitry to generate a third signal corresponding to a read pointer of the buffer in response to the first signal and the second signal, wherein one or more processor cores are to comprise the first hardware logic circuitry and the second hardware logic circuitry and wherein the first signal, corresponding to the first write pointer of the buffer, and the second signal, corresponding to the second write pointer of the buffer, are to be generated based on different data patterns for transmission over different channels, each of the different channels to be coupled between the first hardware logic circuitry and the second hardware logic circuitry.

2. The apparatus of claim 1, wherein the first hardware logic circuitry is in a first clock domain and the second hardware logic circuitry is in a second clock domain.

3. The apparatus of claim 2, wherein the buffer stores data that is to be transmitted from the first clock domain to the second clock domain.

4. The apparatus of claim 1, further comprising a third hardware logic circuitry to determine a number of channels over which to transmit a plurality of signals corresponding to a plurality of write pointers of the buffer.

5. The apparatus of claim 1, wherein the first hardware logic circuitry generates the first signal and the second signal in response to a first clock signal and the second hardware logic circuitry generates the third signal in response to a second clock signal.

6. The apparatus of claim 1, further comprising: a first storage device to store a first data, wherein the first hardware logic circuitry generates the first signal in response to a first clock signal and the first data; and a second storage device to store a second data, wherein the first hardware logic circuitry generates the second signal in response to a second clock signal and the second data.

7. The apparatus of claim 1, wherein: the second hardware logic circuitry generates a fourth signal in response to the first signal and a fifth signal in response to the second signal; and the second hardware logic circuitry comprises a multiplexer to multiplex the fourth and fifth signals to generate the third signal.

8. The apparatus of claim 7, further comprising: a first storage device to store a first data, wherein the second hardware logic circuitry generates the fourth signal in response to a first clock signal and the first data; and a second storage device to store a second data, wherein the second hardware logic circuitry generates the fifth signal in response to a second clock signal and the second data.

9. The apparatus of claim 7, further comprising a first flip-flop to store a first value corresponding to the fourth signal and a second flip-flop to store a second value corresponding to the fifth signal.

10. The apparatus of claim 1, further comprising a first flip-flop to store a first value corresponding to the first signal and a second flip-flop to store a second value corresponding to the second signal.

11. The apparatus of claim 1, wherein the buffer comprises a first-in, first-out (FIFO) buffer.

12. The apparatus of claim 1, wherein a basic input output system (BIOS) is to store the different data patterns in one or more storage devices at initial boot sequence of a computing system that comprises the one or more processor cores.

13. The apparatus of claim 1, wherein a basic input output system (BIOS) is to select the different data patterns from a plurality of generated data patterns at initial boot sequence of a computing system that comprises the one or more processor cores.

14. The apparatus of claim 1, wherein a basic input output system (BIOS) is to select the different data patterns from a plurality of generated data patterns based on strap pins or fuse values.

15. A method comprising: generating a first signal corresponding to a first write pointer of a buffer at a first hardware logic circuitry; generating a second signal corresponding to a second write pointer of the buffer at the first hardware logic circuitry; and generating a third signal corresponding to a read pointer of the buffer in response to the first signal and the second signal at a second hardware logic circuitry, wherein one or more processor cores are to comprise the first hardware logic circuitry and the second hardware logic circuitry and wherein the first signal, corresponding to the first write pointer of the buffer, and the second signal, corresponding to the second write pointer of the buffer, are to be generated based on different data patterns for transmission over different channels, each of the different channels to be coupled between the first hardware logic circuitry and the second hardware logic circuitry.

16. The method of claim 15, further comprising determining a number of channels over which to transmit a plurality of signals corresponding to a plurality of write pointers of the buffer.

17. The method of claim 15, further comprising:
generating the first signal and the second signal in response to a first clock signal; and
generating the third signal in response to a second clock signal.

18. The method of claim 15, further comprising:
generating a fourth signal in response to the first signal, a first clock signal, and a first data;
generating a fifth signal in response to the second signal, a second clock signal, and a second data; and
multiplexing the fourth and fifth signals to generate the third signal.

19. A system comprising: a memory to store data; and at least one processor core comprising: a first domain to store the data in the memory based on a plurality of write pointers; a second domain to read the stored data from the memory based on a read pointer; and hardware logic circuitry to generate a signal corresponding to the read pointer based on a plurality of signals corresponding to the plurality of write pointers and wherein a first signal, corresponding to a first write pointer of the plurality of write pointers, and the second signal, corresponding to a second write pointer of the plurality of write pointers, are to be generated based on different data patterns for transmission over different channels, each of the different channels to be coupled between the first domain and the second domain.

20. The system of claim 19, further comprising logic to determine a number of channels over which to transmit the plurality of signals corresponding to the plurality of write pointers.

21. The system of claim 19, wherein the memory comprises a first-in, first-out (FIFO) buffer.

22. The system of claim 19, wherein the memory and the at least one processor core are on a same die.

23. The system of claim 19, wherein the hardware logic circuitry is in the second domain.

24. The system of claim 19, further comprising a storage device to store a data, wherein the second domain generates the signal corresponding to the read pointer based on the stored data.

25. The system of claim 19, further comprising a multiplexer to multiplex the plurality of signals that correspond to the plurality of write pointers.

26. The system of claim 19, further comprising an audio device.

27. A computer-readable non-transitory storage medium comprising one or more instructions that when executed on a processor configure the processor to: generate a first transmit data and a first receive data for a first channel to transfer one or more signals corresponding to a first plurality of write pointers of a buffer at a first hardware logic circuitry; and generate a second transmit data and a second receive data for a second channel to transfer one or more signals corresponding to a second plurality of write pointers of the buffer after determining that the second channel is to transfer the second plurality of write pointers at a second hardware logic circuitry, wherein one or more processor cores are to comprise the first hardware logic circuitry and the second hardware logic circuitry and wherein a first signal, corresponding to a first write pointer of the buffer, and a second signal, corresponding to a second write pointer of the buffer, are to be generated based on different data patterns for transmission over different channels, each of the different channels to be coupled between the first hardware logic circuitry and the second hardware logic circuitry.

28. The computer-readable non-transitory storage medium of claim 27, further comprising one or more instructions to configure the processor to analyze the generated first transmit data and first receive data to determine whether to transfer the second plurality of write pointers over the second channel.

29. The computer-readable non-transitory storage medium of claim 27, further comprising one or more instructions to configure the processor to store one or more of the first transmit data, the first receive data, the second transmit data, and the second receive data.

30. The computer-readable non-transitory storage medium of claim 27, further comprising one or more instructions to configure the processor to load one or more of the first transmit data, the first receive data, the second transmit data, and the second receive data from a storage device.

* * * * *